(12) United States Patent
VanGilder et al.

(10) Patent No.: US 10,855,565 B2
(45) Date of Patent: Dec. 1, 2020

(54) DYNAMIC EVENT CATALYST SYSTEM FOR DISTRIBUTED NETWORKS

(71) Applicant: Bank of America Corporation, Charlotte, NC (US)

(72) Inventors: Sidney Allen VanGilder, Debary, FL (US); Wendy Wilson-Settle, Rowlett, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 94 days.

(21) Appl. No.: 15/710,307

(22) Filed: Sep. 20, 2017

(65) Prior Publication Data

US 2019/0089608 A1 Mar. 21, 2019

(51) Int. Cl.
*G06F 15/173* (2006.01)
*H04L 12/26* (2006.01)
*H04L 12/24* (2006.01)

(52) U.S. Cl.
CPC ........ *H04L 43/065* (2013.01); *H04L 41/0681* (2013.01); *H04L 43/045* (2013.01); *H04L 41/22* (2013.01)

(58) Field of Classification Search
CPC . H04L 43/065; H04L 43/045; H04L 41/0681; H04L 41/22
USPC ........................................................ 709/224
See application file for complete search history.

(56) References Cited

U.S. PATENT DOCUMENTS

| | | | |
|---|---|---|---|
| 6,360,246 B1 | 3/2002 | Begley et al. | |
| 6,571,283 B1 | 5/2003 | Smorodinsky | |
| 7,035,930 B2 | 4/2006 | Graupner et al. | |
| 7,039,705 B2 | 5/2006 | Graupner et al. | |
| 7,054,934 B2 | 5/2006 | Graupner et al. | |
| 7,281,045 B2 | 10/2007 | Aggarwal et al. | |
| 7,490,073 B1 * | 2/2009 | Qureshi ................ | G06F 11/079 706/50 |
| 7,890,814 B2 | 2/2011 | Zhang et al. | |
| 7,898,947 B2 | 3/2011 | Briscoe et al. | |
| 8,023,429 B2 | 9/2011 | Briscoe et al. | |
| 8,141,090 B1 | 3/2012 | Graupner et al. | |
| 8,201,180 B2 | 6/2012 | Briscoe et al. | |
| 8,208,490 B2 | 6/2012 | Briscoe et al. | |
| 8,719,832 B2 | 5/2014 | Briscoe et al. | |
| 8,812,586 B1 | 8/2014 | Kulkarni et al. | |
| 8,954,557 B2 | 2/2015 | Gusev et al. | |
| 9,215,153 B2 | 12/2015 | DeLuca et al. | |
| 9,794,144 B1 | 10/2017 | Kulkarni et al. | |

(Continued)

*Primary Examiner* — Hannah S Wang
(74) *Attorney, Agent, or Firm* — Michael A. Springs; Moore & Van Allen PLLC; Nicholas C. Russell

(57) ABSTRACT

Embodiments of the present invention provide a system for utilizing an event catalyst database to trigger the generation and transmittal of alert notifications in response to identification of new event reports. An event catalyst database is generated to associate unique combinations of server types and alert types with responsive alert notifications. Data feeds from a distributed network of a plurality of servers are imported and monitored to identify a new event report. A server identifier and an alert type are determined from the new event report and compared to the event catalyst database to determine the appropriate alert notification. The alert notification is generated and transmitted to a computing device of a specialist associated with the new event report.

14 Claims, 5 Drawing Sheets

(56) References Cited

U.S. PATENT DOCUMENTS

| | | |
|---|---|---|
| 2003/0084156 A1 | 5/2003 | Graupner et al. |
| 2003/0101223 A1 | 5/2003 | Pace et al. |
| 2003/0225549 A1 | 12/2003 | Shay et al. |
| 2003/0236822 A1 | 12/2003 | Graupner et al. |
| 2004/0073673 A1 | 4/2004 | Santos et al. |
| 2004/0268188 A1* | 12/2004 | Kirkpatrick ......... G06F 11/0715 714/45 |
| 2007/0150581 A1* | 6/2007 | Banerjee ................ H04L 41/22 709/224 |
| 2008/0244068 A1 | 10/2008 | Iyoda et al. |
| 2009/0106327 A1* | 4/2009 | Dilman ............... G06F 11/0727 |
| 2016/0342350 A1* | 11/2016 | Shoultz ................ G06F 3/0619 |
| 2017/0195265 A1* | 7/2017 | Billi ..................... H04L 51/046 |
| 2017/0249585 A1* | 8/2017 | Teta ..................... G06Q 10/087 |
| 2018/0131579 A1* | 5/2018 | Jacobs ................. H04L 41/046 |
| 2018/0329768 A1* | 11/2018 | Bikumala ............ G06F 11/079 |

* cited by examiner

DYNAMIC EVENT CATALYST SYSTEM FOR DISTRIBUTED NETWORKS

FIELD OF THE INVENTION

The present invention is generally directed to a system for utilizing an event catalyst database to trigger the generation and transmittal of alert notifications in response to identification of new event reports.

BACKGROUND

Current distributed network monitoring for server alerts comprises static monitoring principles that are near-term in nature. As components of a distributed network grow, adjust, and are replaced over time, these static monitoring principles become obsolete.

Therefore, a need exists to gauge the efficiency and behavior of the environment of the distributed network to identify minimal responsive steps to achieve the maximum outcome and productivity in terms of monitoring efficiency. This need includes the dynamic allocation and balancing of monitoring scope based on changes to the monitoring scope, efficiency scope, and priority considerations.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for utilizing an event catalyst database to trigger the generation and transmittal of alert notifications in response to identification of new event reports. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve importing data feeds from a distributed network of a plurality of servers and monitoring the imported data feeds for event reports. The system may then identify a new event report based on the monitoring of the imported data feeds. Next, the system may determine, based on the new event report, a server identifier and an alert type associated with the new event report, wherein the server identifier comprises at least a server type. The system can then compare the determined server type and alert type with stored server types and alert types in an event catalyst database, wherein the event catalyst database associates unique combinations of server types and alert types with responsive alert notifications and responsible specialists. Furthermore, in some embodiments, the system determines, based on the comparison, an alert notification and a specialist associated with the new event report. Finally, the system can generate the determined alert notification and transmit the generated alert notification to a computing device of the determined specialist.

In some embodiments, the system may also identify, based on the comparison, an alert notification tier for the server identifier. The system can then determine that the alert notification tier for the server identifier is lower than an alert notification tier for a different server identifier that has an unresolved event. Finally, the system can modify the alert notification for the server identifier to include instructions for the specialist to defer event resolution until the unresolved event of the different server identifier has been resolved.

The system may, in some embodiments, determine, based on the comparison, that the server identifier and the alert type associated with the new event report do not match with the stored server types and alert types in the event catalyst database. The system can then transmit the new event report to a computing device of a general user trained to identify appropriate alert notifications and appropriate specialists for responding to the event reports. Next, the system may receive, from the computing device of the general user, the alert notification and the specialist associated with the new event report. Finally, the system can combine the server type and the alert type of the new event report with the alert notification and the specialist associated with the new event report in the event catalyst database.

In some embodiments, the system may generate an event snapshot comprising status information for each server in the distributed network of the plurality of servers, and integrate that event snapshot into the generated alert notification.

In some embodiments of the system, the imported data feeds comprise server status information of base health and welfare alerting, historical data associated with the server, event trends over previous predetermined periods of time, and previously enacted resolutions for events that have occurred over the previous predetermined periods of time.

The alert notification of the system may comprise historical data associated with the identified server.

Furthermore, the server identifier of the system may comprise a server serial number that is indicative of the server type, a server location, and a server level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
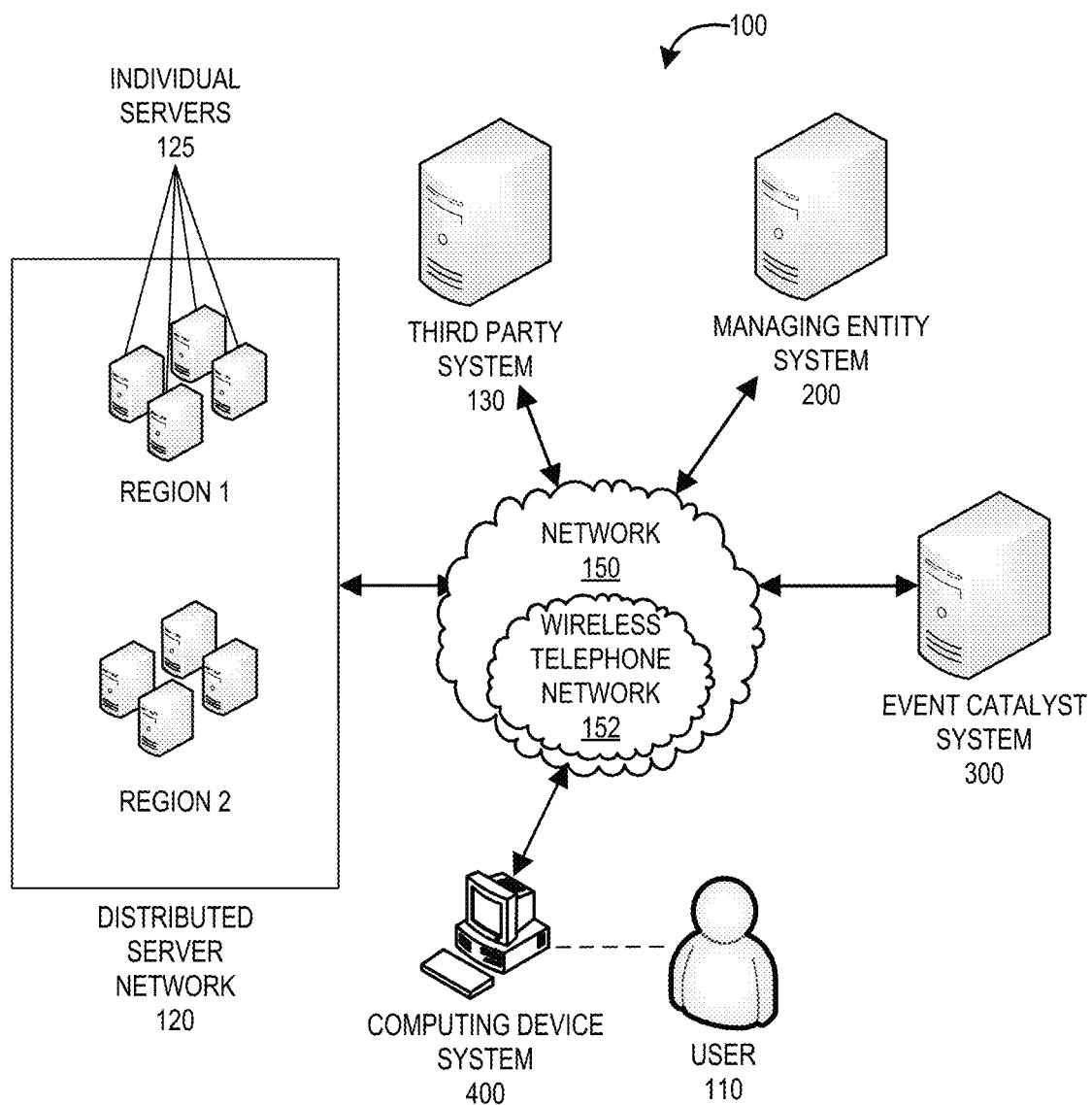
Figure 2:
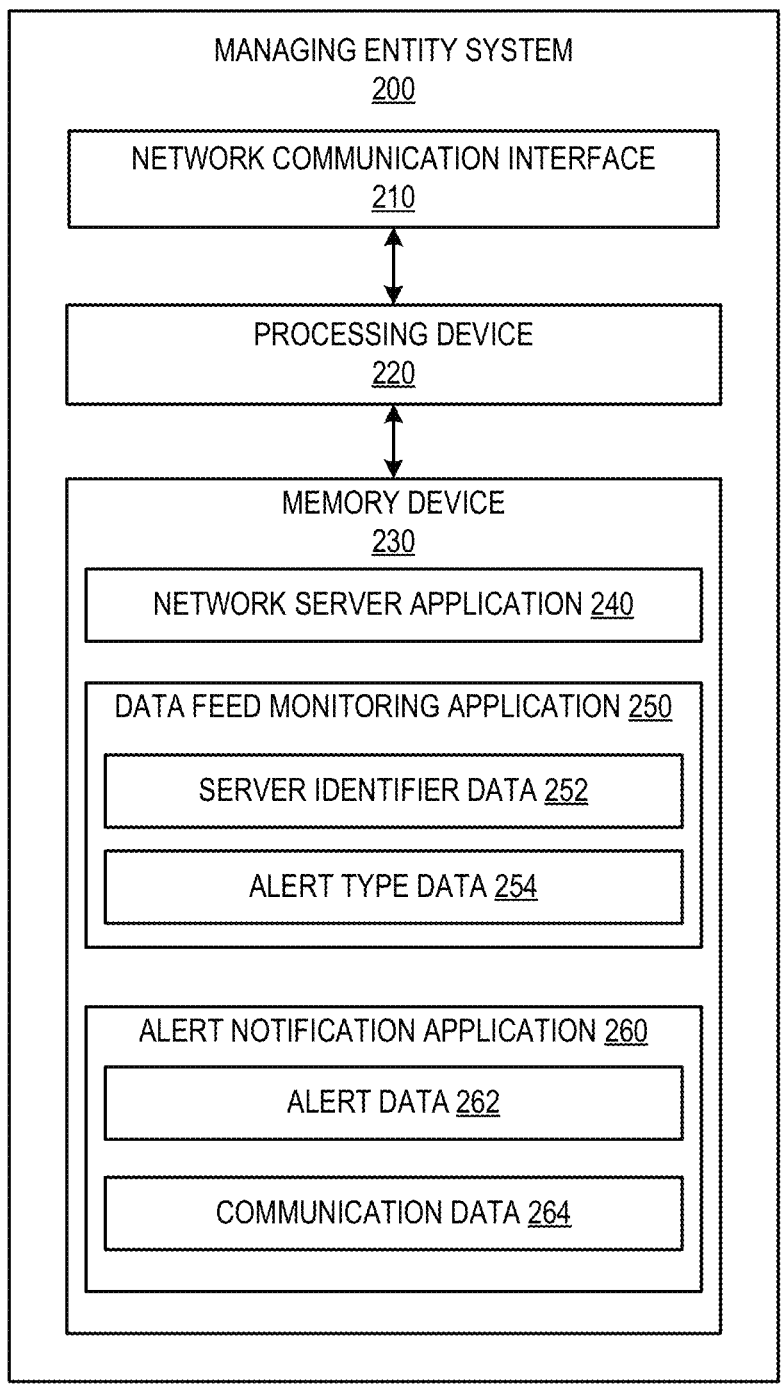
Figure 3:
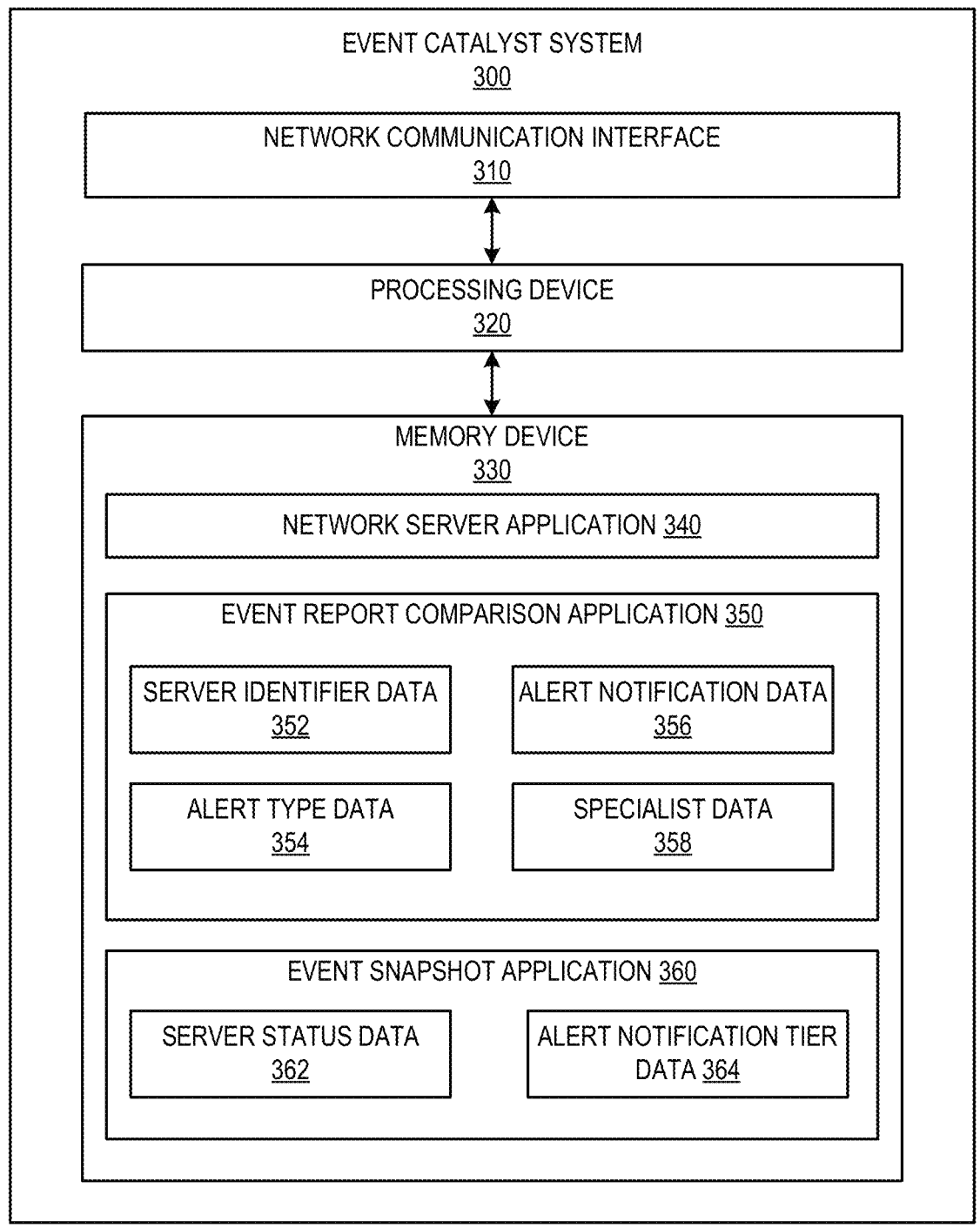
Figure 4:
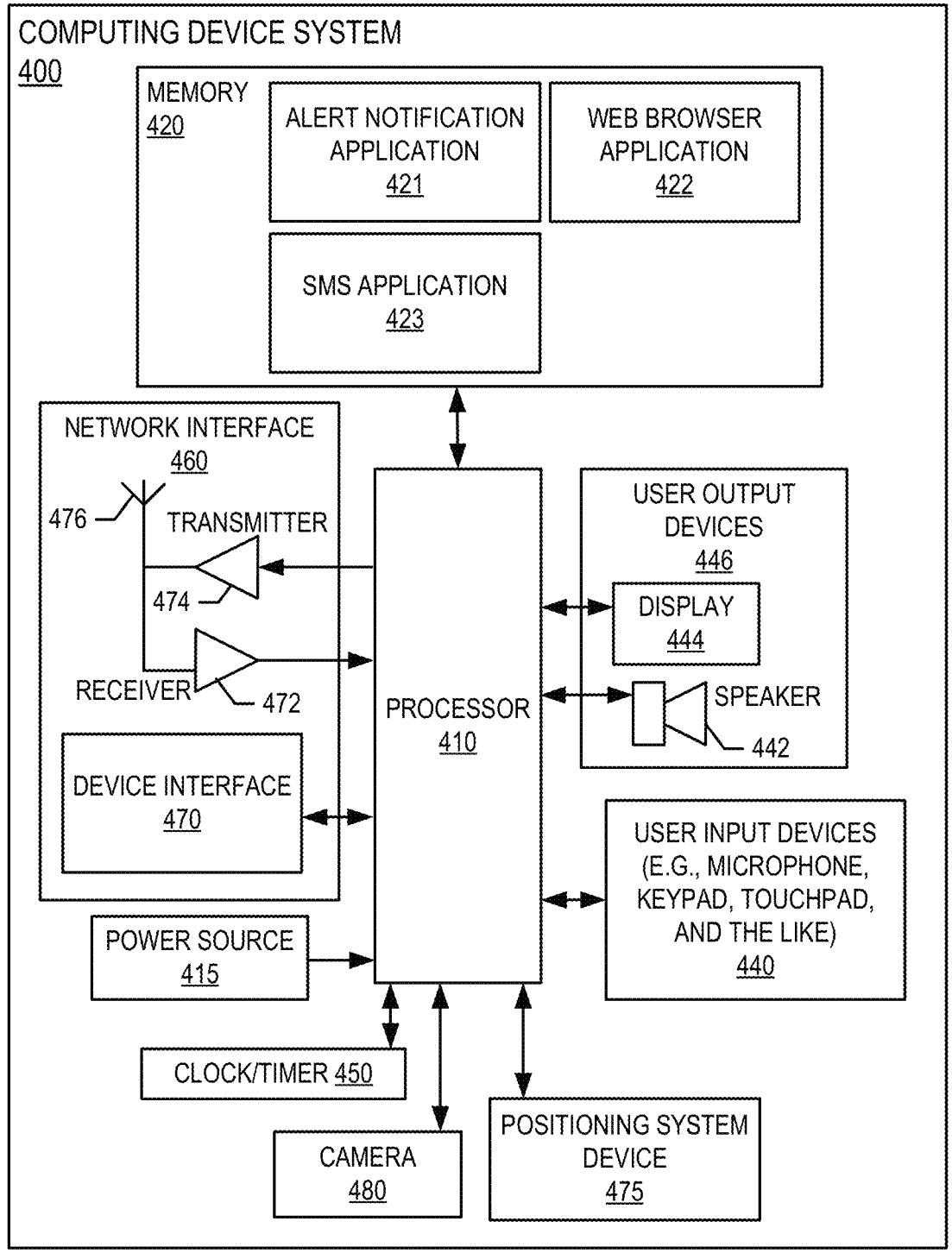
Figure 5:
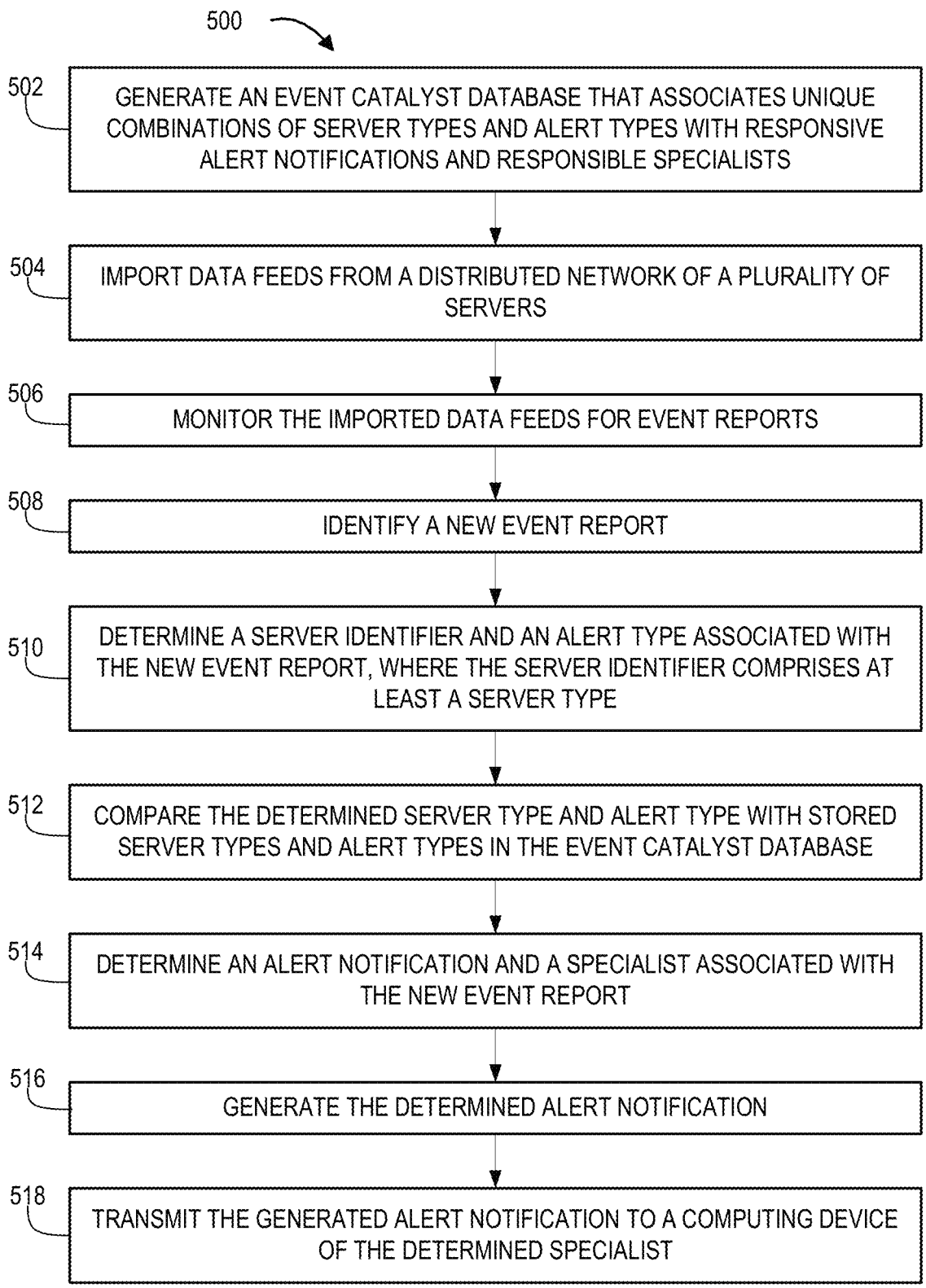

Having thus described embodiments of the invention in general terms, reference will now be made the accompanying drawings, wherein:

FIG. 1 provides a block diagram illustrating a system environment for utilizing an event catalyst database to trigger the generation and transmittal of alert notifications in response to identification of new event reports, in accordance with an embodiment of the invention;

FIG. 2 provides a block diagram illustrating the managing entity system of FIG. 1, in accordance with an embodiment of the invention;

FIG. 3 provides a block diagram illustrating the event catalyst system of FIG. 1, in accordance with an embodiment of the invention;

FIG. 4 provides a block diagram illustrating the computing device system of FIG. 1, in accordance with an embodiment of the invention; and FIG. 5 provides a flowchart illustrating a process for utilizing an event catalyst database to trigger the generation and transmittal of alert notifications in response to identification of new event reports, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for utilizing an event catalyst database to trigger the generation and transmittal of alert notifications in response to identification of new event reports. An event catalyst database is first generated. As used herein, an "event" can be any server alert-triggering incident, server status update, or the like. Within the event catalyst database, unique combinations of server types and alert types are associated or otherwise linked with responsive alert notifications and specialists responsible for resolving the event.

The alert notifications and specialists can be predefined and linked with particular servers, server types, server locations, alerts, alert types, and the like. Data feeds from across a distributed network of servers can be imported and monitored for event reports. When a new event report is identified, a server identifier (e.g. a serial number, a server type, a server location, a server name, a line of business of the server, and the like) is determined, along with an alert type associated with the new event report. The alert type may comprise a server error, a server report, or the like, that is associated with the event.

The determined server type and alert type are then compared with the stored (or otherwise predefined) server types and alert types in the event catalyst database. An alert notification and a specialist associated with the new event report are then determined, and the alert notification is generated. This generated alert notification can then be transmitted to a computing device of the specialist.

In some embodiments, an alert notification tier and/or ranking can be determined. If the alert notification tier for this event report is below another notification alert tier of a server with an unresolved event, the higher-tiered notification alert is given priority. This priority can be incorporated into the notification to the specialist. For example, the system can instruct the specialist to defer event resolution for the lower-tiered alert notification until the issue with the higher-tiered alert notification and server has been resolved.

In such embodiments, the alert notification tiered ranking can be based on factors including, but not limited to, a difficulty in addressing a known event, a potential severity on business operations, a time-based urgency, a location of the server, a number of available backup servers, and the like.

In some embodiments, a snapshot report can be generated and presented to the specialist as part of the generated and transmitted alert notification. The snapshot report can display efficiencies, events, trends, patterns, or other information about individual servers, groups of servers, network regions, servers within lines of business, and the like, across a map to illustrate the health of the distributed network of servers.

If the new event report does not match predefined data, manual input is required, but this manual input can be used to update the event catalyst database. In this way, the system is set up to automatically trigger an appropriate alert notification to the appropriate specialist in response to a future event report of the same type.

FIG. 1 provides a block diagram illustrating a system and environment 100 for utilizing an event catalyst database to trigger the generation and transmittal of alert notifications in response to identification of new event reports, in accordance with an embodiment of the invention. As illustrated in FIG. 1, the system environment 100 includes a managing entity system 200, an event catalyst system 300, a computing device system 400, a distributed server network 120, and one or more third party systems 130.

The system environment 100 also includes a user 110 that is associated with at least the computing device system 400. As used herein, the term "user" represents one or more individuals or groups of individuals tasked with resolving event reports for individual servers 125 within the distributed server network 120 and/or tasked with analyzing event reports to determine an appropriate alert notification and an appropriate specialist to whom the appropriate alert notification should be sent. A user 110 that is tasked with responding to or resolving a server event alert may, in some embodiments, embody a specialist that is trained to perform the resolution tasks to which the user 110 is assigned. A user 110 that is tasked with analyzing event reports to determine the appropriate alert notification and appropriate specialist may, in some embodiments, embody a system administrator that is trained in event report analysis and has a strong understanding of the distributed server network 120 as a whole. In some embodiments, the user 110 is an employee or, or otherwise works for or alongside a managing entity that is associated with the managing entity system 200.

The distributed server network 120 is illustrated in FIG. 1 as having two regions (i.e., Region 1 and Region 2), with each region being made up of a plurality of individual servers 125. However, this illustration is merely for example purposes and any number of individual servers 125, regions, sub-regions, workstations, hubs, and the like, can be embodied within the distributed server network 120. The individual servers 125 may be comprised of the same or different types of servers. For example, the individual servers 125 may be comprised of one or more application servers, one or more web servers, one or more database servers, and the like. These individual servers 125 may be set up in many different locations, both geographically and locally within datacenters. In some embodiments, each individual server 125 comprises a single machine, while in other embodiments, at least some individual servers 125 share one or more machines, boxes, or other server housing units.

Each of the individual servers 125 has a server type, where the server type can comprise a brand of the server, a manufacturer of the server, a product type, a product year, a primary function of the server, one or more secondary functions of the server, a line of business associated with the server, communication channels associated with the server, and the like. A manager, system administrator, or specialist (e.g., the user 110) for each of the individual servers 125 may also have access to the types of alerts, error messages, base health and welfare information, and the like for individual servers 125, along with knowledge of one or more specialists (e.g., the user 110) that should be notified when an event is taking place on that individual server 125. Therefore, this associative information can be predefined, linked together, and provided to the event catalyst system 300 for future user by the managing entity system 200.

The managing entity system 200, the event catalyst system 300, the computing device system 400, the distributed server network 120, and the third party system(s) 130 are in network communication across the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

The managing entity system 200 may be a system owned or controlled by a managing entity to perform one or more process steps described herein. In some embodiments, the managing entity is a financial institution. In general, the managing entity system 200 is configured to communicate with the event catalyst system 300, the computing device system 400, the distributed server network 120, and/or the third party system 130 across the network 150. For example, the managing entity system 200 may be configured to import data feeds from the distributed server network 120, compare the imported data with data stored in the event catalyst system 300, and/or transmit alert notifications to the computing device system 400 associated with the user 110. The managing entity system 200 is described in more detail with respect to FIG. 2.

The event catalyst system 300 may be a system owned or controlled by the managing entity and/or a third party that specializes in predetermining responses and communication channels for new event alerts as they are identified by the managing entity system, 200. The event catalyst system 300 may be in network communication across the network 150 to communicate or receive information, instructions, and the like, from the managing entity system 200, the computing device system 400, the distributed server network 120, and/or the third party system(s) 130. As such, the event catalyst system 300 may be configured to perform or be instructed to perform one or more process steps described herein. The event catalyst system 300 is described in more detail with respect to FIG. 3.

While a single computing device system 400 is illustrated in FIG. 1, it should be noted that any number of computing device systems 400 are contemplated, particularly because each user 110 that is a specialist or system administrator likely has responsibilities for addressing server issues of a limited number of individual servers 125 within the distributed server network 120. The computing device system 400 may be configured to perform one or more of the process steps described herein, such as to receive instructions to display an alert notification on a display of the computing device system 400 such that the user 110 can view the alert notification and respond, if needed. One embodiment of the computing device system 400 is described in more detail with respect to FIG. 4.

While a single third party system 130 is illustrated in FIG. 1, it is contemplated that any number of third party systems 130 may be in network communication with the managing entity system 200, the event catalyst system 300, the computing device system 400, and/or the distributed server network 120, via the network 150. The third party system 130 may be any application, database, system, or the like that is configured to aid the system environment 100. For example, the third party system 130 may provide a platform for hosting an event snapshot that the computing device system 400 can access for displaying the event snapshot to the user 110. In another example, the third party system 130 comprises a separate event catalyst system 300 that is not owned or otherwise controlled by the managing entity, but that permits the managing entity system 200 to access its database as part of the process steps described herein.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a data feed monitoring application 250 which includes server identifier data 252 and alert type data 254, an alert notification application 260 which includes alert data 262, communication data 264, and other computer-executable instructions or other data. The computer-executable program code of the network server application 240, the data feed monitoring application 250, and/or the alert notification application 260 may instruct the processing device 220 to perform certain logic, data-processing, and data-storing functions of the managing entity system 200 described herein, as well as communication functions of the managing entity system 200 through communication across the network 150.

In one embodiment, the data feed monitoring application 250 includes server identifier data 252 and alert type data 254. The server identifier data 252 may comprise data or information about server types (e.g., application servers, web servers, database servers, proxy servers, mail servers, real-time communication servers, file transfer protocol servers, virtual servers, and the like), server locations, server names, lines of business associated with certain servers, server serial numbers, and the like. This server identifier data 252 can be extracted from an event report of a data feed by the managing entity system 200, such that the data feed monitoring application 250 can identify which server, and which server type, is associated with the server event.

The alert type data 254 can include all information and data associated with the possible alerts for each individual server 125 throughout the distributed server network 120. This alert type data 254 enables the data feed monitoring application 250 to identify and extract the type of alert that is occurring from the event report of the data feed. In some embodiments, the alert type data 254 is associated or linked with the server types for which that alert data is possible.

In one embodiment, the alert notification application 260 includes alert data 262. This alert data 262 may include information that can be included in an alert notification, formats for inputting alert information into an alert notification, and the like. This alert data 262 may work in conjunction with the alert notification data 356 of the event catalyst system 300 to identify and convey instructions, warnings, errors, and the like to a specialist associated with a server related to the alert notification.

The communication data 264 may include information about communication channels, communication addresses or numbers, and the like that are necessary to transmit an alert notification from the managing entity system 200 to a computing device system 400 of a user 110.

The network server application 240, the data feed monitoring application 250, and/or the alert notification application 260 can be configured to invoke or use the server identifier data 252, the alert type data 254, the alert data 262, the communication data 264, and/or the like when communicating through the network communication interface 210 with the event catalyst system 300, the computing device system 400, the distributed server network 120, and/or the third party system 130 to implement one or more of process steps described herein.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the event catalyst system 300, the computing device system 400, the distributed server network 120, the third party system 130, and/or the like. The processing device 220 is configured to use the network communication interface 210 to transmit and/or receive data and/or commands to and/or from the other devices connected to the network 150.

FIG. 3 provides a block diagram illustrating the event catalyst system 300, in greater detail, in accordance with embodiments of the invention. As illustrated in FIG. 3, in one embodiment of the invention, the event catalyst system 300 includes one or more processing devices 320 operatively coupled to a network communication interface 310 and a memory device 330. In certain embodiments, the event catalyst system 300 is operated by a first entity, such as a financial institution, while in other embodiments, the event catalyst system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the event catalyst system 300 described herein. For example, in one embodiment of the event catalyst system 300, the memory device 330 includes, but is not limited to, a network server application 340, an event report comparison application 350 which includes server identifier data 352, alert type data 354, alert notification data 356, and specialist data 358, an event snapshot application 360 which includes server status data 362 and alert notification tier data 364, and other computer-executable instructions or other data. The computer-executable program code of the network server application 340, the event report comparison application 350, and/or the event snapshot application 360 may instruct the processing device 320 to perform certain logic, data-processing, and data-storing functions of the event catalyst system 300 described herein, as well as communication functions of the event catalyst system 300.

In one embodiment, the event report comparison application 350 includes server identifier data 352, alert type data 354, alert notification data 356, and specialist data 358. The server identifier data 352 may comprise data or information about server types (e.g., application servers, web servers, database servers, proxy servers, mail servers, real-time communication servers, file transfer protocol servers, virtual servers, and the like), server locations, server names, lines of business associated with certain servers, server serial numbers, and the like. This server identifier data 352 can be extracted from an event report of a data feed by the managing entity system 200, such that the event report comparison application 350 can identify which server, and which server type, is associated with the server event.

The alert type data 354 can include all information and data associated with the possible alerts for each individual server 125 throughout the distributed server network 120. This alert type data 354 enables the event report comparison application 350 to identify and extract the type of alert that is occurring from the event report of the data feed. In some embodiments, the alert type data 354 is associated or linked with the server types for which that alert data is possible.

The alert notification data 356 may comprise appropriate alert notifications, warnings, error messages, instructions, and the like, that can be transmitted to one or more specialists in response to a unique and specific combination of server identifier data 352 and alert type data 354.

The specialist data 358 may comprise one or more appropriate specialists that are responsible for, or otherwise tasked with, resolving server events, which are identified in response to a unique and specific combination of server identifier data 352 and alert type data 354.

The server identifier data 352 and the alert type data 354 can be used by the event report comparison application 350 to match a server identifier or server type and alert type of a new event report with a server identifier and alert type stored within the memory device 330. As the server identifier data 352, linked with the alert type data 354, is linked with the alert notification data 356 and the specialist data 358, the event report comparison application can identify an appropriate alert notification and an appropriate specialist that pairs with the server type and alert type of the new event report. The event report comparison application 350 can then transmit the determined appropriate alert notification and the appropriate specialist, using the network communication interface 310, to the managing entity system 200.

In one embodiment, the event snapshot application 360 includes server status data 362 and alert notification tier data 364. The server status data 362 may include current and historical information about the health and welfare of each individual server 125 in the distributed server network 120. For example, the server status data 362 may include information about whether an unresolved event is currently occurring at a server, when a most recent event occurred and/or was resolved at a server, a frequency of events at a server, an average resolution time at a server, whether a specialist has been assigned to a server at which an unresolved event is currently occurring, and the like.

The event snapshot application 360 can use this server status data 362 to generate, transmit, and/or display a layered map of the individual servers 125 within the distributed server network 120. For example, the event snapshot application 360 can provide nodes, icons, or the like, for each server (or for groups of servers) within the distributed server network 120 as a base layer to the mapped event snapshot. On top of the base layer, the snapshot application 360 can present current status information, as determined by the server status data 362. In another layer (which could be selectable by a user 110 on the computing device system 400 of the user 110), a frequency of events within a predetermined previous period of time (e.g., five minutes, one hour, one day, one week, one month, three months, one year, and the like) at each server or server cluster can be displayed. Any combination of information, as determined using the server status data 362, can be presented on the event snapshot display by the event snapshot application 362, such that the snapshot display can illustrate for the user 110 an efficiency of the network at any given point in time or over a given period of time.

The alert notification tier data 364 may include information about the rank of a particular server and/or its associated alert notification, in relation to other servers and/or alert notifications of the overall network. The ranking can be generated or otherwise determined based on priority information including, but not limited to a difficulty in addressing a known event, a potential severity on business operations, time-based urgency, a location of the server, a number of available backup servers, and the like. In some embodiments, the alert notification tier data 364 can be included in the event snapshot by the event snapshot application 360 through overlaid icons, color coding, specific layers for each rank in the tier, and the like.

The network server application 340, the event report comparison application 350, and/or the event snapshot application 360 are configured to invoke or use the server identifier data 352, the alert type data 354, the alert notification data 356, the specialist data 358, the server status data 362, the alert notification tier data 364, and the like when communicating through the network communication interface 310 with the managing entity system 200, the computing device system 400, the distributed server network 120, and/or the third party system 130.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned.

Some embodiments of the computing device system 400 include a processor 410 communicably coupled to such devices as a memory 420, user output devices 446, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 446 and/or user input devices 440. The user output devices 446 include a display 444 (e.g., a liquid crystal display or the like) and a speaker 442 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The positioning system device 475 may play a crucial role in transmitting location information associated with the computing device system 400 for determining when the computing device system 400 is in at or is in close proximity to a particular server. For example, in some embodiments, the system may be determining which specialist out of a group of specialists should receive the alert notification regarding a server experiencing an event that needs resolution. In such embodiments, the system may analyze position data for each specialist of the group of specialists to identify which specialist is closest to the geographical location of the server. The system can then cause an alert notification to be transmitted to the computing device system 400 of that closest specialist, such that the alert notification is displayed on the display 444 of the computing device system 400 of the specialist.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/ code executed by the processor 410 to implement the functions of the computing device system 400 and/or one or more of the process/method steps described herein. For example, the memory 420 may include such applications as a conventional web browser application 422 and/or an alert notification application 421 (or any other application provided by the managing entity system 200). These applications also typically instructions to a graphical user interface (GUI) on the display 444 that allows the user 110 to interact with the computing device system 400, the managing entity system 200, and/or other devices or systems. In one embodiment of the invention, when the user 110 enrolls in an alert notification application 421 program, the user 110 downloads, is assigned, or otherwise obtains the alert notification application 421 from the managing entity system 200, or from a distinct application server (e.g., from the event catalyst system 300 or a third party system 130). In other embodiments of the invention, the user 110 interacts with the managing entity system 200 or the event catalyst system 300 via the web browser application 422 and/or the SMS application 423 in addition to, or instead of, the alert notification application 421.

The memory 420 of the computing device system 400 may comprise a Short Message Service (SMS) application 423 configured to send, receive, and store data, information, communications, alerts, and the like via the wireless telephone network 152.

The alert notification application 421 may be configured to receive instructions from the managing entity system 200 and/or the event catalyst system 300 for causing the display 444 of the computing device system 400 to present alert notifications such that a user 110 (e.g., a specialist) can be informed of event alerts that require the attention of the user 110.

In some embodiments, the instructions include a request for user input (e.g., for a system administrator to input an appropriate specialist and/or alert notification for the specific event alert being analyzed). In such embodiments, the alert notification application 421 can receive the user input from one or more of the user input devices 440 and automatically transmit the user input to the managing entity system 200 and/or the event catalyst system 300.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIG. 5, a flowchart is provided to illustrate one embodiment of a process 500 for utilizing an event catalyst database to trigger the generation and transmittal of alert notifications in response to identification of new event reports, in accordance with embodiments of the invention. In some embodiments, the process 500 may include block 502, where the system generates an event catalyst database that associates unique combinations of server types and alert types with responsive alert notifications and responsible specialists.

As used herein, a server type can comprise a brand of the server, a manufacturer of the server, a product type, a product year, a primary function of the server, one or more secondary functions of the server, a line of business associated with the server, communication channels associated with the server, and the like. A non-limiting list of example server functions includes application servers, web servers, database servers, proxy servers, mail servers, real-time communication servers, file transfer protocol servers, virtual servers, and the like.

As used herein, an alert type may comprise a server error, a server report, a maintenance report, a server status report, or the like, that is associated with the event of the server. The event may comprise some occurrence, change from normality, or other alteration of the server that triggers event reports that include at least the server type and alert type.

The event catalyst database can comprise a plurality of sets of combined server type and alert type data and their correlation or other association with appropriate alert notifications and/or specialists that are tasked or otherwise prepared to resolve the event. In this way, the system is prepared to match a combined set of at least a server type and an alert type with an alert notification that can be sent to one or more identified specialists.

In some embodiments, the process 500 includes block 504, where the system imports data feeds from a distributed network of a plurality of servers. In some embodiments, the system actively reaches out to each server and/or server grouping in the distributed server network to access the information in the data feeds. In other embodiments, the system sets up direct links to data feeds that are sent directly from the individual servers or server groupings. In such embodiments, the system may continuously monitor these data feeds for new information. In other such embodiments, the system may periodically monitor the data feeds. The periodic monitoring of data fields may additionally utilize priority information for each server and/or server grouping to import or check on the data feeds periodically, where higher priority servers are checked on a more frequent basis than lower priority servers. The priority of servers is discussed below with respect to tiered alert notifications.

The imported data feeds may comprise server status information including, but not limited to, base health and welfare alerting, historical data associated with the server, event trends over previous predetermined periods of time, and previously enacted resolutions for events that have occurred over the previous predetermined periods of time.

Additionally, in some embodiments, the process 500 includes block 506, where the system monitors the imported data feeds for event reports. As such, the system is particularly looking to identify new sets of server identifiers (including server types) and their related alert type. In this way, the system is able to identify an event that is resulting in some kind of error, adjustment to the normal operating conditions, or potential future incident at a single server.

The process 500 may also include block 508, where the system identifies a new event report. Once the system has identified that an event has occurred, this event report can be analyzed, as shown in block 510, where the system determines a server identifier and an alert type associated with the new event report, where the server identifier comprises as least a server type.

The server identifier may, in some embodiments, comprise a server serial number that is indicative of the server type, a server location, and/or a server level. For example, the server serial number may be an alpha-numeric set of characters (e.g., "servertype1-region4-subregion2-servername," with or without the hyphens). The first several characters may be associated with the server type. The next several characters may be associated with a location (e.g., geographical region, building, room, unit, block, network grouping, physical server box, and the like) of the server. The next several characters may be associated with a name and/or number of that specific server. Of course, the ordering of these informative characteristics of the server within the serial number can be in any order, so long as the system is able to know or identify the position(s) within the serial number that is associated with each piece of information about that server.

As mentioned before, the alert type may comprise a server error, a server report, a maintenance report, a server status report, a health and welfare report, or the like, that is associated with the event occurring at the server.

Additionally, in some embodiments, the process 500 includes block 512, where the system compares the determined server type and alert type with stored server types and alert types in the event catalyst database. The system can check to see whether the specific determined server type and alert type are found together in the event catalyst database. If they are found together, the system can check to see whether the event catalyst database links that combination of the server type and alert type to a particular alert notification and/or specialist.

The process 500 may then include block 514, where the system determines an alert notification and a specialist associated with the new event report. In some embodiments, the system may identify multiple specialists associated with the new event report. For example, the event catalyst system may indicate that a group of individuals (e.g., a specific technical support team) may all be qualified and capable of addressing the event at the server. In such embodiments, an efficiency analysis can be implemented to identify a preferred specialist based on at least one of a closeness of the specialists to the server at issue (i.e., based on GPS data of the computing device of each specialist), an average resolution time of each specialist, a success rate of each specialist, a length of employment of each specialist, a duration of experience of each specialist, and the like. The preferred specialist will then be selected as the specialist for all other blocks in the process 500.

The alert notification may comprise historical data associated with the identified server. For example, the historical data included as part of the alert notification may comprise every historical event (e.g., maintenance issue, connection issue, health issue, and the like) that has taken place over a previous predetermined period of time (e.g., the past one minute, the past hour, the past day, the past week, and the like). In addition to this event information, the alert notification may include the steps taken to resolve each listed historical event.

Furthermore, the historical data may comprise trend information. For example, the system may determine that a same type of event has occurred at the same server at a frequency above a threshold amount. That information can be relayed to a specialist by including it in the alert notification. In this way, the system is able to present additional helpful information to a specialist that will enable the specialist to enact the most appropriate solution in a short period of time. Other historical trend information may include a list of related servers (e.g., servers from the same geographic region, server from the same sub-region, servers from the same server block, servers with the same function, and/or the like) that have had the same or similar events occur within a previous predetermined period of time. This may enable a specialist or a system administrator to identify a more-macro problem that can be solved to reduce or end the occurrence of events for each individual server in the related group.

In some embodiments, the system may additionally identify an alert notification tier associated with the server identifier, based on the comparison of the determined server type and alert type with the stored server types and alert types in the event catalyst database. The alert notification tier is a level within an overall tiered scale of alerts for the distributed network. The tiered scale may be based on several factors including, but not limited to, a difficulty in addressing a known event, a potential severity on business operations to which the server is dedicated, an urgency in the amount of time in which it is acceptable for the specific server to be down for maintenance, a geographic location of the server, a number of available backup servers for the server at issue, and the like. The higher tiers are associated with more difficult remedial actions, higher severity on the business operations, shorter acceptable amounts of time to address the event, important geographic locations, and fewer available backup servers for the server at issue, and the like.

This tiered system may dynamically change based on the time of day changes, the number of available backup servers changes, trends in the occurrence of a particular type of event is identified, trends in a frequency of events for a particular server (or related grouping of servers) changes, and the like. As such, the system can identify which server alerts are the most pressing and require the strongest response (e.g., the quickest, requiring the most resources, requiring the most qualified specialists, and the like).

In embodiments with this tiered scale for alerts, the system may determine that the alert notification tier for the server identifier (i.e., from the new event report) is lower than an alert notification tier for a different server that still has an unresolved event. For example, the system may determine that this server identifier is associated with a low-priority server (e.g., a server that does not need to be in operation for a few hours), while another server with an event that has not yet been resolved needs to be operational as soon as possible. This information will be evaluated by the event catalyst system, which in turn will assign different alert notification tier for each of these two servers (i.e., the server associated with the new event report will have a lower alert notification tier than the different server with the urgent, yet unresolved event).

Once the system has determined the disparity in the alert notification levels between the two servers, the system can modify the alert notification for the server identifier to include instructions for the specialist to defer event resolution until the unresolved event of the different server identifier has been fully resolved. This step can be especially useful when both servers are under the purview of the same specialist and/or when the higher-priority server is associated with an issue that may be linked to the newly identified server.

As the system monitors the data feeds over time, an overall event snapshot report can be generated to display a status of each individual server, server block, sub-region of servers, geographic region of servers, functionally related sets of servers, server types, and/or the like within a single map or display. For example, each server with a currently unresolved event may be displayed as a first color within the event snapshot report. Additionally or alternatively, each type of event reported for servers may be associated with its own color, number, keyword, icon, symbol, or the like within the event snapshot.

In embodiments where server alerts are tiered based on severity, a need for prompt action, or potential severity, the tiered level of each alert can be illustrated in the event snapshot as a representative color from a tiered color scale. In other embodiments, the tiered alert levels can be indicated based on opacity or transparency of the icon, symbol, keyword, or the like within the event snapshot.

This event snapshot report can be integrated into the determined alert notification, such that the event snapshot will be reported out to the specialist as the specialist is notified of the new event report. In this way, the system is able to notify the specialist with important macro-level information about the health of the distributed network of servers, as a whole, and/or specific regions and/or types of servers associated with the server of the new event report. This allows the specialist to have a better understanding of what remedial action(s) are necessary to address the current issue from the event report without focusing solely on the individual server associated with the new event report.

Furthermore, the process 500 may include block 516, where the system generates the determined alert notification. As mentioned above, the determined alert notification may comprise information about the server at issue, the alert type at issue, historical data associated with the server and/or other aspects of the distributed server network (e.g., other servers in the same line of business or other servers in the same geographical area), an alert notification tier (and associated instructions), the event snapshot, and the like.

Finally, the process 500 may continue to block 518, where the system transmits the generated notification to a computing device of the determined specialist. In such embodiments, the system can transmit control signals to the computing device of the specialist to cause a user interface of the computing device to present the alert notification on a display of the user interface. In some embodiments, the system can request or allow for user input via the user interface. For example, the system can transmit instructions to causer the computing device of the specialist to display a request for confirmation of completion of the resolution of the event that caused the new event report. In such embodiments, computing device of the specialist can receive user input that indicates the completion of the resolution of the event and transmit this indication of completion back to the system, which in turn can update the event snapshot in real-time.

In some embodiments, the system may determine, based on the comparison, that the server identifier and the alert type associated with the new event report do not match with the stored server types and alert types in the event catalyst database. In such embodiments, the system may transmit the new event report to a computing device of a general user (e.g., a system administrator) trained to identify appropriate alert notifications and appropriate specialists for responding to the event reports. The general user can then provide this user input using user input devices of the computing device of the user.

The system may then receive, from the computing device of the general user, the alert notification and the specialist associated with the new event report. Finally, the system can combine the server type and the alert type of the new event report with the alert notification and the specialist associated with the new event report in the event catalyst database. In this way, the system has stored, within the event catalyst database, a link between the unique combination of the server type and alert type and the appropriate alert notification and responsible specialist. Therefore, in a future run through the process 500, when the same server type and alert type are identified and extracted from an event report, the system can determine the appropriate match in the comparison step of block 512.

As will be appreciated by one of skill in the art, the present invention may be embodied as a method (including, for example, a computer-implemented process, a business process, and/or any other process), apparatus (including, example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for utilizing an event catalyst database to trigger a generation and transmittal of alert notifications in response to identification of new event reports, the system comprising:
   a memory device; and
   a processor operatively coupled to the memory device, wherein the processor is configured to execute computer-readable program code to:

import data feeds from a distributed network of a plurality of servers;
monitor the imported data feeds for event reports;
identify, based on the monitoring of the imported data feeds, a new event report;
determine, based on the new event report, a first server identifier of a first server and an alert type associated with the new event report, wherein the first server identifier comprises at least a server type;
compare the determined server type and the determined alert type with stored server types and stored alert types in the event catalyst database, wherein the event catalyst database associates unique combinations of server types and alert types with responsive alert notifications and responsible specialists, and wherein the responsive alert notifications comprise predefined alert notifications that are linked with the unique combinations of server types and alert types;
determine, based on the comparison, that the first server identifier and the alert type associated with the new event report do not match with the stored server types and the stored alert types in the event catalyst database;
transmit the new event report to a computing device of a general user trained to identify appropriate alert notifications and appropriate specialists for responding to the event reports;
receive, from the computing device of the general user, an alert notification and a specialist associated with the new event report;
combine the server type and the alert type of the new event report with the alert notification and the specialist associated with the new event report in the event catalyst database;
determine the alert notification and the specialist associated with the new event report;
generate the determined alert notification;
identify an alert notification tier for the first server identifier, wherein the alert notification tier is determined based on a difficulty in addressing a known event, a potential severity on business operations to which the first server is dedicated, an urgency in an amount of time in which it is acceptable for the first server to be down for maintenance, a geographic location of the first server, and a number of available backup servers for the first server, wherein the alert notification tier is included in an event snapshot by an event snapshot application, wherein the alert notification tier dynamically changes based on change in a time of day, change in the number of available backup servers, trends in an occurrence of an event type, and trends in a frequency of events for the first server;
determine that the alert notification tier for the first server identifier is lower than an alert notification tier for a second server identifier that has an unresolved event, further comprises determining that the first server identifier is associated with a low-priority server and the second server identifier that has the unresolved event is associated with a high-priority server;
modify the generated alert notification for the first server identifier to a modified alert notification that includes instructions for the determined specialist to defer event resolution for the first server identifier of the low-priority server until the unresolved event of the second server identifier of the high-priority server has been resolved; and
automatically transmit, via a communication channel, the modified alert notification to a mobile computing device of the determined specialist.

2. The system of claim 1, wherein the processor is further configured to execute computer-readable program code to:
generate the event snapshot comprising status information for each server in the distributed network of the plurality of servers; and
integrate the event snapshot into the generated alert notification.

3. The system of claim 1, wherein the imported data feeds comprise server status information of base health and welfare alerting for each of the plurality of servers, historical data associated with each of the plurality of servers, event trends over previous predetermined periods of time for each of the plurality of servers, and previously enacted resolutions for events that have occurred over the previous predetermined periods of time for each of the plurality of servers.

4. The system of claim 1, wherein the generated alert notification comprises historical data associated with the first server.

5. The system of claim 1, wherein the first server identifier comprises a server serial number that is indicative of the server type, a server location, and a server level.

6. A computer program product for utilizing an event catalyst database to trigger a generation and transmittal of alert notifications in response to identification of new event reports, the computer program product comprising at least one non-transitory computer readable medium storing computer readable instructions that are executed by a processor to perform:
importing data feeds from a distributed network of a plurality of servers;
monitoring the imported data feeds for event reports;
identifying, based on the monitoring of the imported data feeds, a new event report;
determining, based on the new event report, a first server identifier of a first server and an alert type associated with the new event report, wherein the first server identifier comprises at least a server type;
comparing the determined server type and the determined alert type with stored server types and stored alert types in the event catalyst database, wherein the event catalyst database associates unique combinations of server types and alert types with responsive alert notifications and responsible specialists, and wherein the responsive alert notifications comprise predefined alert notifications that are linked with the unique combinations of server types and alert types;
determining, based on the comparison, that the first server identifier and the alert type associated with the new event report do not match with the stored server types and the stored alert types in the event catalyst database;
transmitting the new event report to a computing device of a general user trained to identify appropriate alert notifications and appropriate specialists for responding to the event reports;
receiving, from the computing device of the general user, an alert notification and a specialist associated with the new event report;
combining the server type and the alert type of the new event report with the alert notification and the specialist associated with the new event report in the event catalyst database;

determining the alert notification and the specialist associated with the new event report;
generating the determined alert notification;
identifying an alert notification tier for the first server identifier, wherein the alert notification tier is determined based on a difficulty in addressing a known event, a potential severity on business operations to which the first server is dedicated, an urgency in an amount of time in which it is acceptable for the first server to be down for maintenance, a geographic location of the first server, and a number of available backup servers for the first server, wherein the alert notification tier is included in an event snapshot by an event snapshot application, wherein the alert notification tier dynamically changes based on change in a time of day, change in the number of available backup servers, trends in an occurrence of an event type, and trends in a frequency of events for the first server;
determining that the alert notification tier for the first server identifier is lower than an alert notification tier for a second server identifier that has an unresolved event, further comprises determining that the first server identifier is associated with a low-priority server and the second server identifier that has the unresolved event is associated with a high-priority server;
modifying the generated alert notification for the first server identifier to a modified alert notification that includes instructions for the determined specialist to defer event resolution for the first server identifier of the low-priority server until the unresolved event of the second server identifier of the high: priority server has been resolved; and
automatically transmitting, via a communication channel, the modified alert notification to a mobile computing device of the determined specialist.

7. The computer program product of claim 6, wherein the computer readable instructions further comprise instructions for:
generating the event snapshot comprising status information for each server in the distributed network of the plurality of servers; and
integrating the event snapshot into the generated alert notification.

8. The computer program product of claim 6, wherein the imported data feeds comprise server status information of base health and welfare alerting for each of the plurality of servers, historical data associated with each of the plurality of servers, event trends over previous predetermined periods of time for each of the plurality of servers, and previously enacted resolutions for events that have occurred over the previous predetermined periods of time for each of the plurality of servers.

9. The computer program product of claim 6, wherein the generated alert notification comprises historical data associated with the first server.

10. The computer program product of claim 6, wherein the first server identifier comprises a server serial number that is indicative of the server type, a server location, and a server level.

11. A computer implemented method for utilizing an event catalyst database to trigger a generation and transmittal of alert notifications in response to identification of new event reports, said computer implemented method comprising:
importing data feeds from a distributed network of a plurality of servers;
monitoring the imported data feeds for event reports;
identifying, based on the monitoring of the imported data feeds, a new event report;
determining, based on the new event report, a first server identifier of a first server and an alert type associated with the new event report, wherein the first server identifier comprises at least a server type;
comparing the determined server type and the determined alert type with stored server types and stored alert types in the event catalyst database, wherein the event catalyst database associates unique combinations of server types and alert types with responsive alert notifications and responsible specialists, and wherein the responsive alert notifications comprise predefined alert notifications that are linked with the unique combinations of server types and alert types;
determining, based on the comparison, that the first server identifier and the alert type associated with the new event report do not match with the stored server types and the stored alert types in the event catalyst database;
transmitting the new event report to a computing device of a general user trained to identify appropriate alert notifications and appropriate specialists for responding to the event reports;
receiving, from the computing device of the general user, an alert notification and a specialist associated with the new event report;
combining the server type and the alert type of the new event report with the alert notification and the specialist associated with the new event report in the event catalyst database;
determining the alert notification and the specialist associated with the new event report;
generating the determined alert notification;
identifying an alert notification tier for the first server identifier, wherein the alert notification tier is determined based on a difficulty in addressing a known event, a potential severity on business operations to which the first server is dedicated, an urgency in an amount of time in which it is acceptable for the first server to be down for maintenance, a geographic location of the first server, and a number of available backup servers for the first server, wherein the alert notification tier is included in an event snapshot by an event snapshot application, wherein the alert notification tier dynamically changes based on change in a time of day, change in the number of available backup servers, trends in an occurrence of the event type, and trends in a frequency of events for the first server;
determining that the alert notification tier for the first server identifier is lower than an alert notification tier for a second server identifier that has an unresolved event, further comprises determining that the first server identifier is associated with a low-priority server and the second server identifier that has the unresolved event is associated with a high-priority server;
modifying the generated alert notification for the first server identifier to a modified alert notification that includes instructions for the determined specialist to defer event resolution for the first server identifier of the low-priority server until the unresolved event of the second server identifier of the high-priority server has been resolved; and
automatically transmitting, via a communication channel, the modified alert notification to a mobile computing device of the determined specialist.

12. The computer implemented method of claim 11, further comprising:

generating the event snapshot comprising status information for each server in the distributed network of the plurality of servers; and integrating the event snapshot into the generated alert notification.

13. The computer implemented method of claim 11, wherein the imported data feeds comprise server status information of base health and welfare alerting for each of the plurality of servers, historical data associated with each of the plurality of servers, event trends over previous predetermined periods of time for each of the plurality of servers, and previously enacted resolutions for events that have occurred over the previous predetermined periods of time for each of the plurality of servers.

14. The computer implemented method of claim 11, wherein the generated alert notification comprises historical data associated with the first server.

* * * * *